United States Patent [19]
Boeck

[11] Patent Number: 5,416,150
[45] Date of Patent: May 16, 1995

[54] RESIN COMPOSITION

[75] Inventor: Harry Boeck, Fairy Meadow, Australia

[73] Assignee: Hachiro Shinpo, Tokyo, Japan

[21] Appl. No.: 285,773

[22] Filed: Aug. 4, 1994

Related U.S. Application Data

[63] Continuation of Ser. No. 47,055, Apr. 12, 1993, abandoned, which is a continuation of Ser. No. 898,680, Jun. 15, 1992, abandoned, which is a continuation of Ser. No. 735,946, Jul. 25, 1991, abandoned, which is a continuation of Ser. No. 597,875, Oct. 12, 1990, abandoned.

[30] Foreign Application Priority Data

Oct. 16, 1989 [JP] Japan .................................. 1-269339

[51] Int. Cl.$^6$ ............................. C08K 3/26; C08K 3/22
[52] U.S. Cl. ...................................... 524/425; 524/431; 524/497; 252/387
[58] Field of Search ................ 524/425, 427, 413, 431, 524/497, 426; 252/387

[56] References Cited

U.S. PATENT DOCUMENTS

| | | | |
|---|---|---|---|
| 3,891,591 | 8/1975 | Chang et al. ......................... | 524/238 |
| 3,935,151 | 1/1976 | Nickerson et al. ................... | 524/813 |
| 4,144,212 | 3/1979 | Linder et al. ........................ | 524/818 |
| 4,243,430 | 1/1981 | Sperry et al. ........................ | 524/426 |
| 4,367,300 | 1/1983 | Aoki et al. ............................ | 524/8 |
| 4,740,390 | 4/1988 | Cody et al. .......................... | 524/432 |
| 4,797,444 | 1/1989 | Cowles et al. ....................... | 524/413 |
| 4,830,778 | 5/1987 | Yamamoto et al. ................. | 524/426 |

*Primary Examiner*—Peter A. Szekely
*Attorney, Agent, or Firm*—Oblon, Spivak, McClelland, Maier & Neustadt

[57] ABSTRACT

A resin composition comprises an aqueous emulsion of an acrylic resin, titanium oxide, iron oxide, and calcium carbonate.

12 Claims, No Drawings

RESIN COMPOSITION

This application is a Continuation of application Ser. No. 08/047,055, filed on Apr. 12, 1993, now abandoned, which is a Continuation of application Ser. No. 07/898,680, filed on Jun. 15, 1992, now abandoned, which is a Continuation of application Ser. No. 07/735,946, filed on Jul. 25, 1991, now abandoned, which is a Continuation of application Ser. No. 07/597,875, filed on Oct. 12, 1990, now all abandoned.

BACKGROUND OF THE INVENTION

1. Field of the Invention

The present invention relates to a resin composition which is used as an elastic coating material, a rust-prevention elastic coating material, a salt-damage prevention coating material, or the like.

2. Description of the Prior Art

Conventionally, various coatings such as acrylic, epoxy-type, urethane-type, and alkyd-type coatings and the like are used for coating ordinary structures such as concrete and mortar, metal structures such as steel bridges, steel towers, steel structures, metal roofing, and the like, or metal parts such as vessel hulls, vehicle wheels, machinery, and the like.

However, all such conventional coatings have their good features, and their bad features. The aqueous coatings, which are easy to use, have superior adhesive characteristics but do not exhibit a particularly good rust prevention effect.

In Japanese Laid-Open Patent Application No. 63-308078 a waterproofing film is disclosed into which a fine inorganic powder, such as potassium carbonate, powdered talc, glass beads, silica flour, titanium dioxide, or the like, is dispersed, as well as a pigment dispersing agent and a defoaming agent.

In Japanese Laid-Open Patent Application No. 1-9273 a transparent, brilliant finishing agent containing polyurethane resin, a wetting agent, an anti-foam agent, and water is disclosed.

In Japanese Laid-Open Patent Application No. 1-9275 a anti-slip material is disclosed which is a blend of an anti-slip powder containing an aggregate and a hydraulic cement, and a resin emulsion containing an acrylic synthetic resin.

In Japanese Laid-Open Patent Application No. 1-153583, water is added to a mixture of portland cement, titanium dioxide, and an acrylic resin powder and the resulting slurry is applied as a primer to a cement structure.

In Japanese Laid-Open Patent Application No. 1-297485 the development of an acrylic-resin-type sealant comprising an acrylic resin, ammonia, zinc oxide and calcined alumina is disclosed.

In Japanese Laid-Open Patent Application No. 1-297479, a coking agent comprising an acrylic resin, ammonia, zinc oxide, potassium carbonate, and ethylene glycol monobutyl ether is disclosed.

In Japanese Laid-Open Patent Application No. 2-30648, the development is disclosed of an add-in material comprising an aqueous emulsion of an acrylic copolymer, a defoaming agent, and a rust preventive which, when added to cement, concrete, or mortar improves their strength and provides waterproofing characteristics.

In Japanese Laid-Open Patent Application No. 2-29467, a coating for a one-liquid acrylic finish comprising an acrylic resin, a defoaming agent, a flow and wetting agent, an in-can preserver, a mold-proofing agent, a pigment dispersing agent, an inorganic agent, a drying and coalescing agent, and water is disclosed.

Japanese Laid-Open Patent Application No. 2-43270 discloses a coloring, sealing, finishing agent comprising as its main ingredients an aqueous emulsion of an acrylic copolymer, a defoaming agent, ethylene glycol monobutyl ether, a carboxylated acrylic copolymer, and benzoisothiazoline, to which pigments are added.

SUMMARY OF THE INVENTION

An object of the present invention is to provide, with due consideration to the drawbacks of such conventional devices, a resin composition with superior elasticity, an anti-rusting effect, a salt-damage prevention effect, and the like.

This object is achieved in the present invention by the provision of a resin composition comprising an aqueous emulsion of a synthetic resin, titanium oxide, iron oxide, and calcium carbonate.

The resin composition of the present invention possesses the following superior properties.

(1) Although the resin composition of the present invention is an aqueous product it does not require another rust preventive undercoat or primer, but can be applied directly to a steel or iron substrate to demonstrate a rust prevention effect. Even in the case where rust has already developed, this composition can be applied without the necessity of a preliminary treatment where the first signs of red rust have appeared. Even in the case where rusting has reached an intermediate stage, only a simple surface preparation of the rusted areas is required before applying this composition.

Accordingly, the composition of the present invention provides an ideal protective coating for bridges, railings, steel columns, steel tubing, metal roofing, plants, ships, and the like.

(2) The resin composition of the present invention has superior adhesive strength and exhibits a high degree of close adhesion to metals such as steel and iron, concrete, mortar, wood, and stone. It is therefore capable of protecting the surfaces of these materials over a long period of time.

(3) The resin composition of the present invention can be stretched and is highly flexible. It therefore prevents cracking of the coated film from the extension of hairline body cracks, thermal expansion, and thermal contraction.

(4) The composition is elastic and can be utilized as a colored finish coating for concrete structures and the like.

(5) The composition is highly resistant to salt damage and also functions as a gas barrier to prevent breakdown of the alkaline components of concrete and prevent the deterioration of concrete and mortar.

DETAILED DESCRIPTION OF THE PREFERRED EMBODIMENTS

Examples of acrylic resin emulsions which can be given are homopolymers or copolymers of acrylic monomers such as acrylic acid, methacrylic acid or their esters, and the like; and copolymers of monomers which can copolymerize with styrene and the like and the above-mentioned acrylic monomers.

The amount of the acrylic resin is preferably in the range of 30 to 50 wt %, more preferably in the range of 35 to 42 wt %, of the resin composition of the present invention as a solid component.

The amount of the titanium oxide is preferably in the range of 2.5 to 5 wt %, more preferably in the range of 3 to 5 wt %, of the resin composition of the present invention.

The amount of the iron oxide is preferably in the range of 3 to 4 wt. %, more preferably in the range of 3 to 3.6 wt. %, of the resin composition of the present invention.

In addition, the amount of the calcium carbonate is preferably in the range of 8 to 15 wt. %, more preferably in the range of 8 to 13 wt. %, of the resin composition of the present invention.

To obtain the resin composition of the present invention, the titanium oxide, iron oxide, and calcium carbonate are blended in a powder form into an aqueous emulsion of the acrylic resin to form a slurry. The particle size of the powdered material is preferably in the 3 to 25 $\mu$m range.

The resin composition of the present invention may, as required, contain other synthetic resins such as styrene-butadiene rubber latex, polyvinyl acetate, ethylene and vinyl acetate copolymers and the like, as well as additives such as coloring agents, emulsifying agents, defoaming agents or the like.

The resin composition of the present invention is applied as a coating to steel or concrete and hardened by curing to form a film with superior adhesive qualities.

EXAMPLE

Titanium dioxide, ferric oxide, and calcium carbonate were added to an aqueous emulsion of acrylic resin to prepare a resin coating material with the following composition.

| | |
|---|---|
| Acrylic resin (solid component) | 38.9 wt % |
| Titanium dioxide (TiO$_2$) | 3.3 wt % |
| Ferric oxide (Fe$_2$O$_3$) | 3.4 wt % |
| Calcium carbonate (CaCO$_3$) | 10.9 wt % |
| Water | 41.0 wt % |
| Other minor components | 2.5 wt % |

This coating material was applied directly (two coats) to a half portion of a piece of steel material on which red rust was beginning to form. The coating was allowed to cure and tests were run to determine the rust prevention effect. The results are given in Table 1.

TABLE 1

| Rust prevention tests | | |
|---|---|---|
| | Test results | |
| | Uncoated portion | Coated portion |
| Salt water spray test (500 hrs) | Rust | No change |
| Seawater spray test (3 months) | Rust | No change |

The same coating material was applied to concrete and allowed to cure. The adhesive strength, water permeability, and elongation ratio were evaluated. The results are given in Table 2.

TABLE 2

| Evaluation results | | |
|---|---|---|
| | | Measured value |
| Adhesion*[1] | Normal condition | 25 kgf/cm$^2$ |
| Strength | After testing | 22 kgf/cm$^2$ |
| Water permeability*[2] | | 0.04 ml |
| Elongation ratio*[3] | | 500% |

*[1] Test method conforming to JIS A6910 Standards for adhesion tractive test
*[2] Test method conforming to JIS A6910 Standards, Article 5.10
*[3] Test method conforming to JIS A6910 Standards, Article 5.13

The above coating, when applied to mortar, wood, and stone showed the same superior adhesive characteristics as when used on steel and concrete, giving a high degree of close adhesion. The coated film also had the desired degree of elasticity.

What is claimed is:

1. A method of preventing rust on a metal substrate in need thereof, comprising applying to said substrate a resin composition comprising a rust preventing effective amount of an aqueous emulsion of an acrylate resin, titanium oxide, ferric oxide and calcium carbonate wherein said acrylic resin is in an amount of 30–50 wt % as a solid component, said titanium oxide is in an amount of 2.5–5wt %, said ferric oxide is in an amount of 3–4 wt %, said calcuim carbonate is in an amount of 8–15 wt % and the rest being, up 100 wt % total, water and other miscellaneous addititves.

2. The method of claim 1, wherein said acrylic resin is in amount of 35–42 wt % as a solid component, said titanium oxide is in an amount of 3–5 wt %, said ferric oxide is in an amount of 3–3.6 wt %, and said calcium carbonate is in an amount of 8–13 wt %.

3. A method of preventing rust on a metal substrate in need thereof, comprising applying to said substrate a resin composition comprising an aqueous emulsion of an acrylate resin, titanium oxide, ferric oxide and calcium carbonate, wherein said acrylic resin is in an amount of 38.9 wt. % as a solid component, said titanium oxide is an amount of 3.3 wt. %, said ferric oxide is in an amount of 3.4 wt. % and said calcium carbonate is in an amount of 10.9 wt. %.

4. The method of claim 1, wherein said substrate is a piece of steel.

5. The method of claim 1, wherein said titanium oxide, said ferric oxide and said calcium carbonate are in powder form.

6. The method of claim 5, wherein said powder material has a particle size of from 3 to 25 $\mu$m.

7. A method of preventing salt damage to a substrate in need thereof, comprising apply to said substrate a resin composition comprising a salt damage preventing effective amount of an aqueous emulsion of an acrylic resin, titanium oxide, ferric oxide and calcium carbonate, wherein said acrylic resin is in an amount of 30–50 wt % as a solid component, said titanium oxide is in an amount of 2.5–5 wt %, said ferric oxide is in an amount of 3–4%, said calcium carbonate is in an amount of 8–15 wt % and the rest being, up to 100wt % water and other miscellaneous additives.

8. The method of claim 7, wherein said acrylic resin is in an amount of 35–42 wt % as a solid component, said titanium oxide is in an amount of 3–5 wt %, said ferric oxide is in an amount of 3–3.6 wt %, and said calcium carbonate is in an amount of 8–13 wt %.

9. The method of claim 7, wherein said acrylic resin is in an amount of 38.9 wt % as a solid component, said titanium oxide is in an amount of 3.3 wt %, said ferric oxide is in an amount of 3.4 wt %, and said calcium carbonate is in an amount of 10.9 wt %.

10. The method of claim 7, wherein said titanium oxide, said ferric oxide and said calcium carbonate are in powder form.

11. The method of claim 10, wherein said powder material has a particle size of from 3 to 25 $\mu$m.

12. The method of claim 7, wherein said substrate is selected from the group consisting of concrete and mortar.

* * * * *

UNITED STATES PATENT AND TRADEMARK OFFICE
CERTIFICATE OF CORRECTION

PATENT NO. : 5,416,150
DATED : May 16, 1995
INVENTOR(S) : Harry BOECK It is certified that error appears in the above-identified patent and that said Letters Patent is hereby corrected as shown below:

Column 1, line 43, "a anti-slip" should read --an anti-slip--.
Column 4, line 23, "addititves" should read --additives--;
        line 42, "apply" should read --applying--;
        line 53, "in amount" should read --in an amount--.

Signed and Sealed this

Twenty-third Day of July, 1996

Attest:

BRUCE LEHMAN

*Attesting Officer*      *Commissioner of Patents and Trademarks*